(12) United States Patent
Tsubusaki et al.

(10) Patent No.: US 12,102,576 B2
(45) Date of Patent: Oct. 1, 2024

(54) VEHICLE

(71) Applicant: YAMAHA HATSUDOKI KABUSHIKI KAISHA, Iwata (JP)

(72) Inventors: Shunsuke Tsubusaki, Shizuoka (JP); Masanori Yoshihara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/374,700

(22) Filed: Sep. 29, 2023

(65) Prior Publication Data

US 2024/0016678 A1    Jan. 18, 2024

Related U.S. Application Data

(63) Continuation of application No. PCT/JP2021/014362, filed on Apr. 2, 2021.

(51) Int. Cl.
*A61G 5/10* (2006.01)
*A61G 5/04* (2013.01)

(52) U.S. Cl.
CPC ............... *A61G 5/1078* (2016.11); *A61G 5/04* (2013.01)

(58) Field of Classification Search
CPC ........ A61G 5/1078; A61G 5/04; A61G 5/045; B62J 1/00; B62K 25/04; B62K 2005/001; B62K 5/10; B60G 17/00
See application file for complete search history.

(56) References Cited

FOREIGN PATENT DOCUMENTS

| AU | 583432 B2 | 4/1989 |
| EP | 2 075 183 A1 | 7/2009 |
| JP | 10-216178 A | 8/1998 |
| JP | 2000-085378 A | 3/2000 |
| JP | 2000-247155 A | 9/2000 |
| JP | 2003-261039 A | 9/2003 |
| JP | 2004-275486 A | 10/2004 |
| JP | 2004-321312 A | 11/2004 |
| JP | 2007-061342 A | 3/2007 |
| JP | 3975572 B2 | 9/2007 |
| JP | 2018-051101 A | 4/2018 |
| JP | 2019-064359 A | 4/2019 |
| JP | 2019-097601 A | 6/2019 |
| JP | 2020-048611 A | 4/2020 |
| JP | 2020-050160 A | 4/2020 |
| WO | 2020/009704 A1 | 1/2020 |
| WO | 2021/132534 A1 | 7/2021 |

OTHER PUBLICATIONS

Official Communication issued in International Patent Application No. PCT/JP2021/014362, mailed on Jun. 29, 2021.
Official Communication issued in corresponding European Patent Application No. 21935037.8, mailed on Apr. 18, 2024.

*Primary Examiner* — Karen Beck
(74) *Attorney, Agent, or Firm* — Keating & Bennett, LLP

(57) ABSTRACT

A vehicle includes a seat on which a passenger is to be seated, a rear suspension to support rear wheels, and a drive source to drive the rear wheels. Pivots of the rear suspension are located forward relative to a rotation shaft of the rear wheels. A relationship WB/Dw≤2.5 is satisfied, where WB is a wheelbase of the vehicle, and Dw is an outer diameter of the rear wheels. A relationship 3.0≤Hs/Hp is satisfied, where Hp is a height from a level road surface to the pivots, and Hs is a distance in an up-down direction between an upper end portion of a front portion of the seat and a line of action where a reaction of a driving force that the rear wheels receive from the road surface acts on the pivots.

14 Claims, 9 Drawing Sheets

VEHICLE

CROSS REFERENCE TO RELATED APPLICATIONS

This application is a Continuation Application of PCT Application No. PCT/JP2021/014362 filed on Apr. 2, 2021. The entire contents of this application are hereby incorporated herein by reference.

BACKGROUND OF THE INVENTION

1. Field of the Invention

The present invention relates to a vehicle.

2. Description of the Related Art

A handle-type electric wheelchair has been known as one of the vehicles that run with a human on board (e.g., Japanese Laid-Open Patent Publication No. 2000-247155). A handle-type electric wheelchair is sometimes referred to as an electric cart.

Generally, handle-type electric wheelchairs are used for traveling on relatively flat paved roads. For example, the user can ride a handle-type electric wheelchair between home and a store to do shopping.

SUMMARY OF THE INVENTION

There is a need to further improve the driving performance and the ride comfort of such vehicles.

A vehicle according to a preferred embodiment of the present invention includes at least three wheels including a front wheel and a rear wheel, a drive source to drive the rear wheel, and a rear suspension including a swing arm supporting the rear wheel and a pivot that is located forward of a rotation shaft of the rear wheel, and a seat on which a passenger is to be seated, wherein a relationship WB/Dw≤2.5 is satisfied where WB is a wheelbase of the vehicle, and Dw is an outer diameter of the rear wheel, and a relationship 3.0≤Hs/Hp is satisfied where Hp is a height from a level road surface to the pivot, and Hs is a distance in an up-down direction between an upper end portion of a front portion of the seat and a line of action La where a reaction of a driving force that the rear wheel receives from the road surface acts on the pivot as seen in a side view of a predetermined state in which the vehicle is stationary on the road surface and when an object having a mass of 75 kg is placed on the seat.

In order to improve the running performance on unpaved roads and bumps of the vehicle, one may consider increasing the outer diameter of the wheels. On the other hand, where the length of the vehicle in the front-rear direction is limited, the wheelbase may be short if the outer diameter of the wheel is increased. If the wheelbase is short, pitching is likely to occur during acceleration and deceleration, and the passenger may feel discomfort.

In a preferred embodiment of the present invention, in the vehicle having a short wheelbase where WB/Dw≤2.5 is satisfied, 3.0≤Hs/Hp may be satisfied.

Thus, a moment that acts on the pivot during acceleration and deceleration can be set to an appropriate magnitude, and it is possible to reduce or prevent pitching.

A vehicle according to a preferred embodiment of the present invention includes at least three wheels including a front wheel and a rear wheel, a drive source to drive the rear wheel, and a rear suspension including a swing arm supporting the rear wheel and a pivot located forward of a rotation shaft of the rear wheel, and a seat on which a passenger is to be seated, wherein a relationship WB/Dw≤2.5 is satisfied where WB is a wheelbase of the vehicle, and Dw is an outer diameter of the rear wheel, and a relationship 3.0≤(Hg−Hp)/Hp is satisfied where Hp is a height from a level road surface to the pivot, and Hg is a height from the road surface to an upper end portion of a front portion of the seat in a predetermined state in which the vehicle is stationary on the road surface and when an object having a mass of 75 kg is placed on the seat.

In order to improve the running performance on unpaved roads and bumps of the vehicle, one may consider increasing the outer diameter of the wheels. On the other hand, where the length of the vehicle in the front-rear direction is limited, the wheelbase may be short if the outer diameter of the wheel is increased. If the wheelbase is short, pitching is likely to occur during acceleration and deceleration, and the passenger may feel discomfort.

In a preferred embodiment of the present invention, in the vehicle having a short wheelbase where WB/Dw≤2.5 is satisfied, a relationship 3.0≤(Hg−Hp)/Hp is satisfied.

As a result, by increasing the distance between the upper end portion of the front portion of the seat, which is a position of the center of gravity, and the position of the pivot, it is possible to increase the proportion by which the pitching caused by the reaction that the rear wheel receives from the road surface during acceleration and deceleration is reduced or prevented by the inertia force. Thus, it is possible to reduce or prevent pitching during acceleration and deceleration.

In a preferred embodiment, the line of action may pass through the position at which the rear wheel contacts the road surface and a center of the pivot as seen in a side view of the predetermined state.

As a result, it is possible to reduce or prevent pitching while taking into consideration the transmission of, to the pivot, the reaction that the rear wheel receives from the road surface.

In a preferred embodiment, a relationship 3.0≤Hs/Hp 6.0 may be satisfied.

As a result, in the vehicle having a short wheelbase WB where 3.0≤Hs/Hp≤6.0 is satisfied, the moment acting on the pivot during acceleration and deceleration can be set to an appropriate magnitude, and it is possible to reduce or prevent pitching.

In a preferred embodiment, a relationship 3.0≤(Hc−Hp)/Hp may be satisfied where Hc is a height from the road surface to an upper end portion of a seat surface of the seat in the predetermined state.

As a result, by increasing the distance between the seat surface position of the seat and the position of the pivot, it is possible to increase the proportion by which the pitching caused by the reaction that the rear wheel receives from the road surface during acceleration and deceleration is reduced or prevented by the inertia force. Thus, it is possible to reduce or prevent pitching during acceleration and deceleration.

In a preferred embodiment, a relationship 3.0≤(Hc−Hp)/Hp≤6.0 may be satisfied in the predetermined state.

As a result, as the distance between the seat surface position of the seat and the position of the pivot is increased, it is possible to reduce or prevent pitching during acceleration and deceleration.

In a preferred embodiment, a relationship 3.0≤(Hg−Hp)/Hp≤6.0 may be satisfied in the predetermined state.

As a result, in the vehicle having a short wheelbase where $3.0 \leq (Hg-Hp)/Hp \leq 6.0$ is satisfied, it is possible to increase the proportion by which the pitching caused by the reaction that the rear wheel receives from the road surface during acceleration and deceleration is reduced or prevented by the inertia force. Thus, it is possible to reduce or prevent pitching during acceleration and deceleration. In a preferred embodiment, a relationship $1.5 \leq WB/Dw \leq 2.5$ may be satisfied.

As a result, in the vehicle having a short wheelbase, it is possible to reduce or prevent pitching during acceleration and deceleration.

In a preferred embodiment, the seat may include a seat base and a cushion above the seat base, and a height from the road surface to an upper end portion of the seat base may be 500 mm or more in the predetermined state.

As a result, as the position of the seat is as high as 500 mm or more, even if the wheelbase WB is short and the passenger's foot space is small, the passenger can be seated.

In a preferred embodiment, a height from the road surface to the upper end portion of the seat base may be 500 mm or more and 700 mm or less in the predetermined state.

As a result, as the position of the seat is high, even if the wheelbase is short and the passenger's foot space is small, the passenger can be seated.

In a preferred embodiment, a height of the pivot may be lower than a height of a rotation shaft of the rear wheel in the predetermined state.

As a result, the moment acting on the pivot during acceleration and deceleration can be set to an appropriate magnitude, and it is possible to reduce or prevent pitching.

In a preferred embodiment, the wheel stroke of the suspension may be 60 mm or more.

As a result, as the wheel stroke is as large as 60 mm or more, it is possible to improve the driving performance on unpaved roads and bumps.

In a preferred embodiment, the wheel stroke of the suspension may be 60 mm or more and 150 mm or less.

As a result, as the wheel stroke is large, it is possible to improve the driving performance on unpaved roads and bumps.

In a preferred embodiment, the vehicle may be an electric wheelchair including a handle to be steered by the passenger.

As a result, it is possible to realize an electric wheelchair, wherein pitching during acceleration and deceleration is reduced or prevented.

In order to improve the running performance on unpaved roads and bumps of the vehicle, one may consider increasing the outer diameter of the wheels. On the other hand, where the length of the vehicle in the front-rear direction is limited, the wheelbase may be short if the outer diameter of the wheel is increased. If the wheelbase is short, pitching is likely to occur during acceleration and deceleration, and the passenger may feel discomfort.

In a preferred embodiment of the present invention, in the vehicle having a short wheelbase where $WB/Dw \leq 2.5$ is satisfied, a relationship $3.0 \leq Hs/Hp$ may be satisfied.

Thus, the moment acting on the pivot during acceleration and deceleration can be set to an appropriate magnitude, and it is possible to reduce or prevent pitching.

In a preferred embodiment, in the vehicle having a short wheelbase where $WB/Dw \leq 2.5$ is satisfied, a relationship $3.0 \leq (Hg-Hp)/Hp$ may be satisfied.

As a result, by increasing the distance between the upper end portion of the front portion of the seat, which is the position of the center of gravity, and the position of the pivot, it is possible to increase the proportion by which the pitching caused by the reaction that the rear wheel receives from the road surface during acceleration and deceleration is reduced or prevented by the inertia force. Thus, it is possible to reduce or prevent pitching during acceleration and deceleration.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described with reference to the drawings. Like elements are denoted by like reference signs, and will not be described redundantly. The terms front, rear, up, down, left and right, as used in the description below, refer to these directions as seen from a passenger seated in the seat of the vehicle. The left-right direction of the vehicle may be referred to as the vehicle width direction. Note that the following preferred embodiments are illustrative, and the present invention is not limited to the following preferred embodiments.

Figure 1:
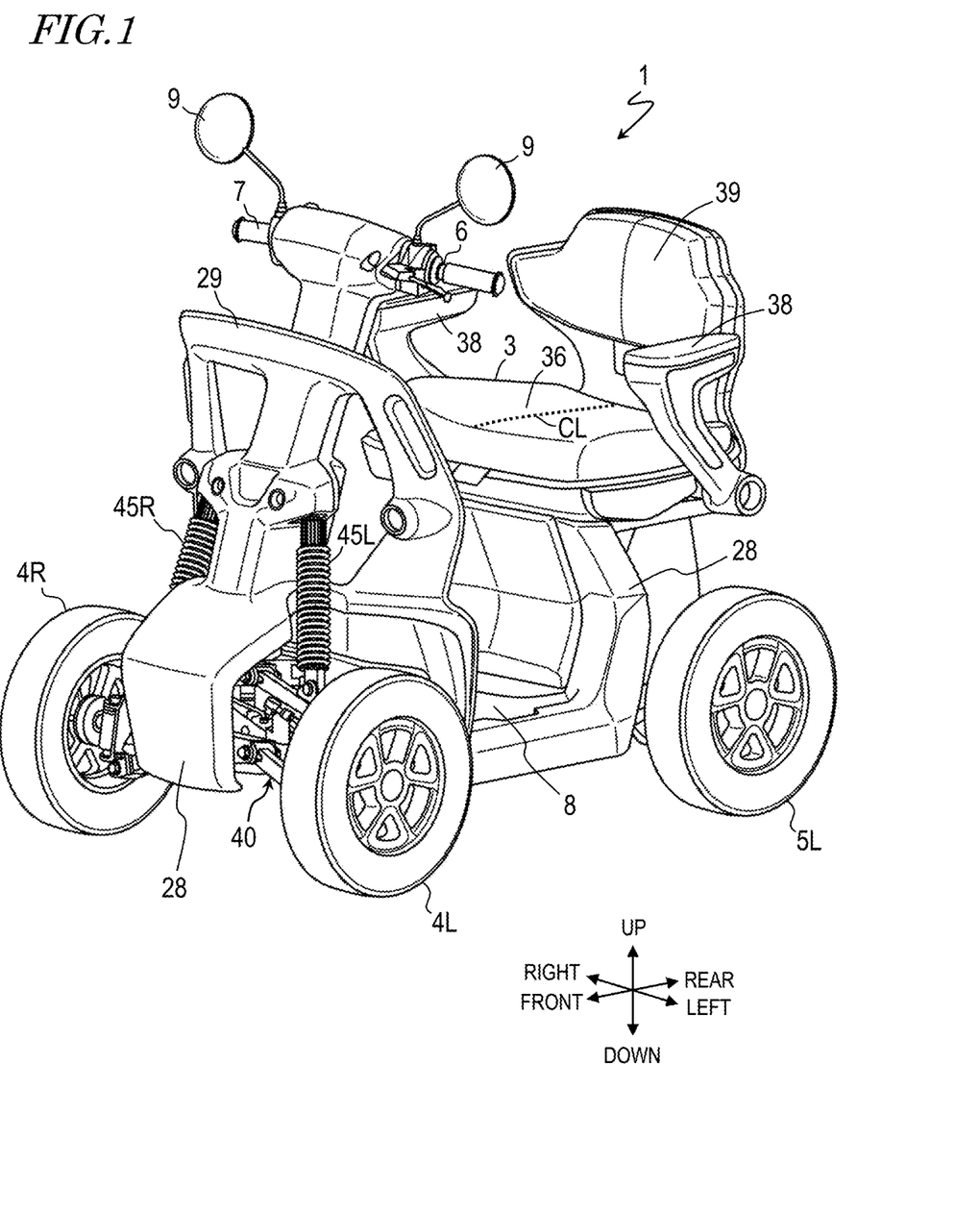
FIG. 1 is a perspective view showing a vehicle 1 according to a preferred embodiment of the present invention.
Figure 2:
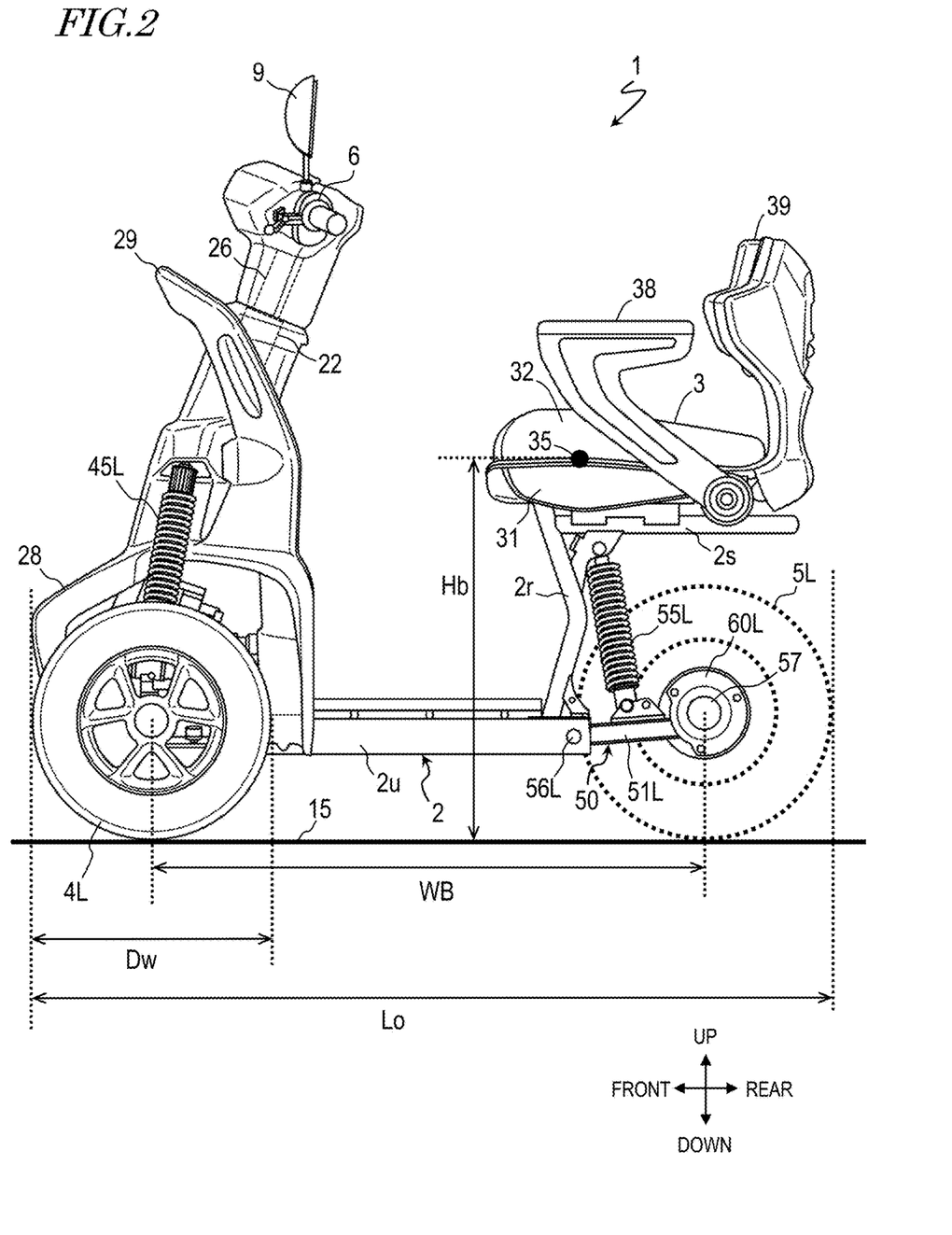
FIG. 2 is a left side view showing the vehicle 1 according to a preferred embodiment of the present invention.
Figure 3:
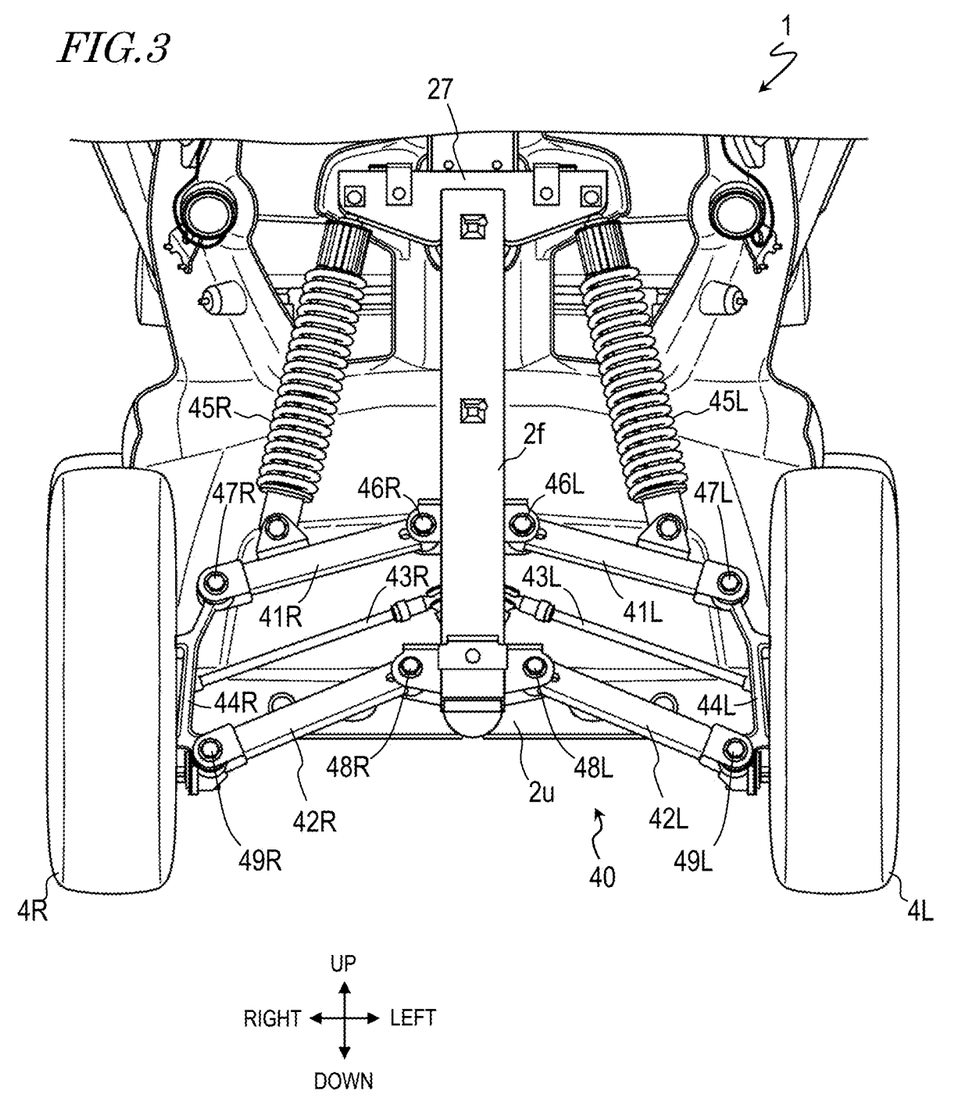
FIG. 3 is a front view showing the vehicle 1 according to a preferred embodiment of the present invention.

FIG. 1 is a perspective view showing a vehicle 1 according to a preferred embodiment. FIG. 2 is a left side view showing the vehicle 1. FIG. 3 is a front view showing the vehicle 1. In order to clearly illustrate the structure of the vehicle 1, a portion of the body cover is omitted in the figures. The vehicle 1 is, for example, a handle-type electric wheelchair, but the present invention is not limited thereto. An example in which the vehicle 1 is a handle-type electric wheelchair will be described below.

The vehicle 1 includes a vehicle body frame 2 (FIG. 2). The vehicle body frame 2 includes an under frame 2u, a rear frame 2r, a seat frame 2s and a front frame 2f (FIG. 3). The under frame 2u extends in the front-rear direction of the vehicle 1. The rear frame 2r extends upward from a rear portion of the under frame 2u, and the seat frame 2s extends rearward from an upper portion of the rear frame 2r. The front frame 2f extends upward from a front portion of the under frame 2u.

A head tube 22 (FIG. 2) is provided on an upper portion of the front frame 2f (FIG. 3). The head tube 22 rotatably supports a steering column 26 passing through the inside thereof. A handle 6 that is steered by the passenger is provided on an upper end portion of the steering column 26. An accelerator operator 7 (FIG. 1) and a pair of, left and right, rearview mirrors 9 are provided on the handle 6.

A body cover 28 is provided so as to cover a portion of the vehicle body frame 2. A front guard 29 is provided on the body cover 28. With the front guard 29 arranged forward of the passenger, it is possible to provide the passenger with a sense of security when driving.

An independent front suspension 40 is provided on the front frame 2f (FIG. 3). The front suspension 40 includes an upper arm 41L, a lower arm 42L and a shock absorber 45L. One end of the upper arm 41L is rotatably supported by the front frame 2f via a pivot 46L. The other end of the upper arm 41L rotatably supports a knuckle arm 44L via a pivot 47L. One end of the lower arm 42L is rotatably supported by the front frame 2f via a pivot 48L. The other end of the lower arm 42L rotatably supports the knuckle arm 44L via a pivot 49L. The knuckle arm 44L rotatably supports the front wheel 4L.

The front suspension 40 includes an upper arm 41R, a lower arm 42R and a shock absorber 45R. One end of the upper arm 41R is rotatably supported by the front frame 2f via a pivot 46R. The other end of the upper arm 41R rotatably supports a knuckle arm 44R via a pivot 47R. One end of the lower arm 42R is rotatably supported by the front frame 2f via a pivot 48R. The other end of the lower arm 42R rotatably supports the knuckle arm 44R via a pivot 49R. The knuckle arm 44R rotatably supports the front wheel 4R. The front suspension 40 rotatably supports the front wheels 4L and 4R via the knuckle arms 44L and 44R. The front wheels 4L and 4R are steered wheels.

The front suspension 40 may be referred to as a double wishbone-type suspension. In the present specification, the arm shape of the double wishbone-type suspension is not limited to the A-letter shape (V-letter shape). In the present specification, "double wishbone-type" is a generic term for a suspension system in which the wheels are supported by a pair of, upper and lower, arms.

The front frame 2F is provided with a suspension tower 27. The upper portions of the shock absorbers 45L and 45R are rotatably supported by the suspension tower 27. The lower portion of the shock absorber 45L rotatably supports the upper arm 41L. The lower portion of the shock absorber 45R rotatably supports the upper arm 41R.

The front frame 2f extends in the up-down direction at a position in the vicinity of the center in the vehicle width direction. The frame portion to which the suspension is attached is required to have high strength because the impact received by the suspension from the road surface is transmitted thereto. Where the suspension tower 27 is provided in the vicinity of the left and right end portions of the vehicle body, high strength needs to be provided in the frame portion extending in the left-right direction from the central portion in the vehicle width direction, thus resulting in a large vehicle body weight. By providing the suspension tower 27 on the front frame 2f located in the vicinity of the center in the vehicle width direction, there is no longer a need for such a frame portion having high strength and extending in the left-right direction, thus realizing a reduced vehicle body weight.

The shock absorbers 45L and 45R are attached to the upper arms 41L and 41R.

Figure 4A:
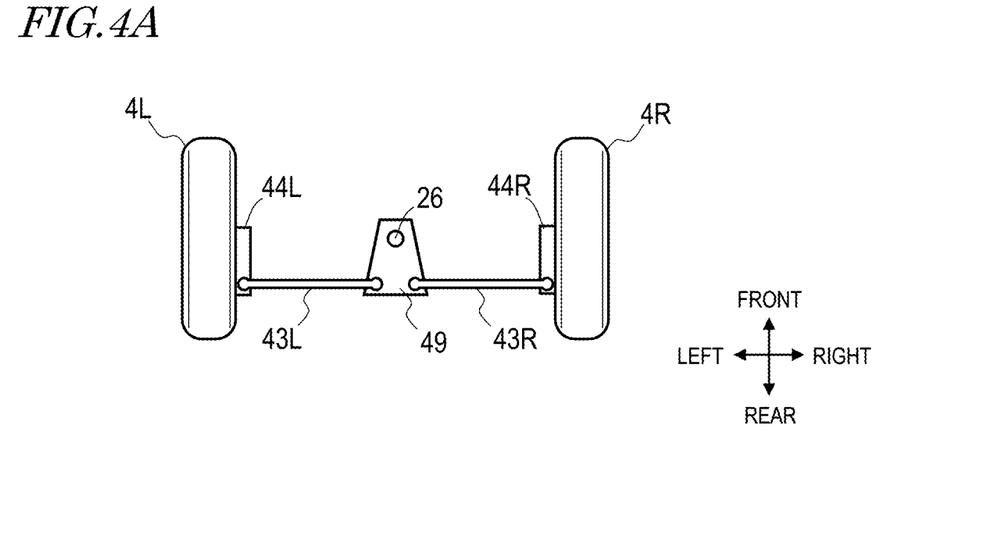
FIG. 4A is a plan view showing an overview of a steering mechanism included in the vehicle 1 according to a preferred embodiment of the present invention.
Figure 4B:
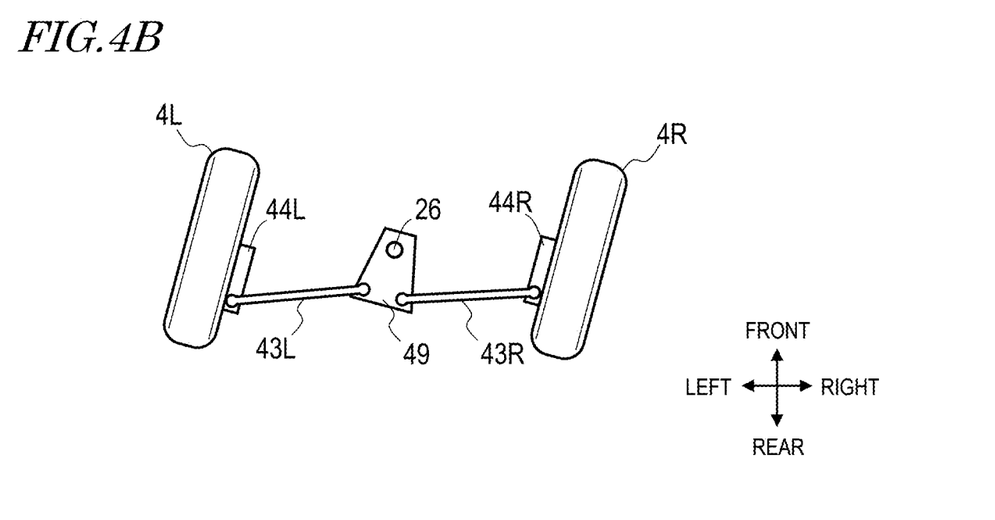
FIG. 4B is a plan view showing an overview of the steering mechanism of the vehicle 1 according to a preferred embodiment of the present invention.

FIGS. 4A and 4B are plan views showing an overview of the steering mechanism of the vehicle 1. A pitman arm 49 is attached to the lower end portion of the steering column 26. One end of a tie rod 43L and one end of a tie rod 43R are each rotatably connected to pitman arm 49. The other end of the tie rod 43L is rotatably connected to the knuckle arm 44L. The other end of the tie rod 43R is rotatably connected to the knuckle arm 44R.

FIG. 4A shows the steering mechanism when traveling straight. When traveling through a curve, the passenger turns the handle 6 (FIG. 1). Referring to FIG. 4B, the steering force generated by the passenger turning the handle 6 is transmitted to the pitman arm 49 via the steering column 26. The pitman arm 49 rotates around the steering column 26 and the steering force is transmitted to the front wheels 4L and 4R via the tie rods 43L and 43R and the knuckle arms 44L and 44R. The transmitted steering force changes the steering angle of the front wheels 4L and 4R, allowing the vehicle 1 to travel while turning left or right.

Referring to FIG. 1 and FIG. 2, a seat 3, on which the passenger is seated, is provided on the seat frame 2s. The seat 3 includes a seat base 31 provided on the seat frame 2s and a cushion 32 provided on the seat base 31.

The seat base 31 is also called a plate member or a bottom plate. The seat base 31 defines the bottom portion of the seat 3 and provide the strength of the seat 3 as a whole. Therefore, the sheet base 31 is formed from a relatively rigid material. The material of the sheet base 31 can be, for example, but not limited to, a metal material or a synthetic resin material such as polypropylene.

The cushion 32 is overlaid on the surface of the seat base 31. The cushion 32 can be formed from a material that retains appropriate elasticity over time to maintain good ride comfort. For example, but not limited to, polyurethane foam (urethane foam) can be used as the material for the cushion 32.

On both sides of the seat 3, armrests 38 are provided on which the passenger places his/her arms. The armrests 38 also serve as side guards. At the rear portion of the seat 3, a backrest 39 is provided on which the passenger leans.

The under frame 2u is provided with a footboard 8 (FIG. 1) on which the passenger places his/her feet. The footboard 8 has a non-slip finish. The upper surface of the footboard 8 has a generally flat shape so that the passenger can easily get in and out of the vehicle.

Figure 5:
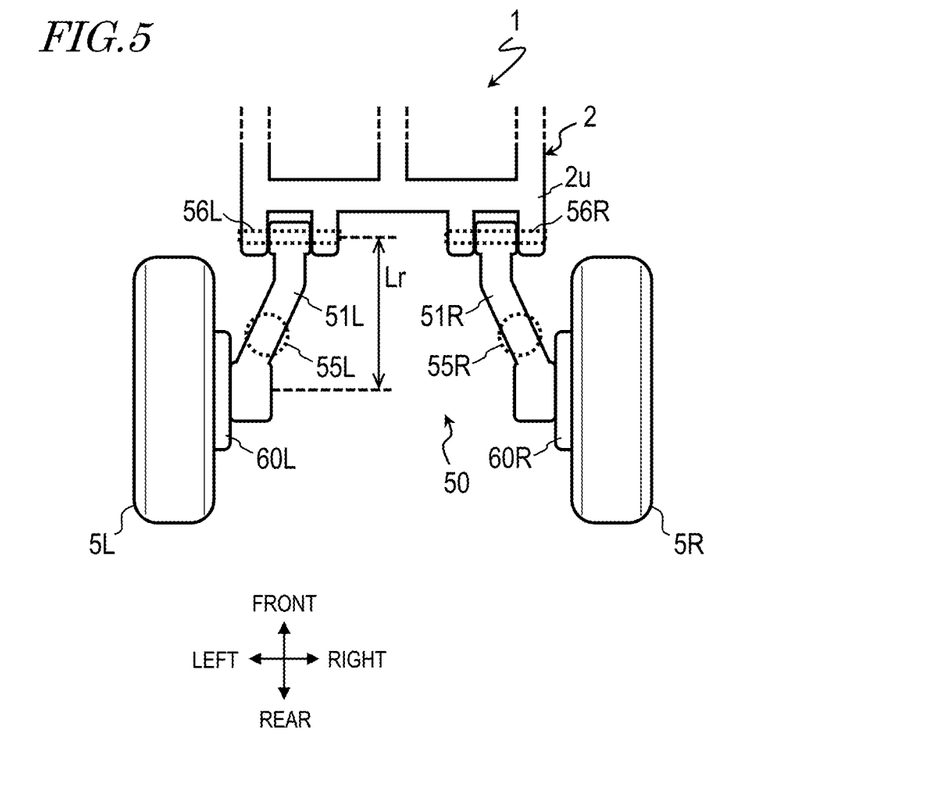
FIG. 5 is a front view showing a rear suspension 50 according to a preferred embodiment of the present invention.

An independent rear suspension 50 (FIG. 2) is provided at the rear portion of the under frame 2u. FIG. 5 is a front view showing the rear suspension 50. The rear suspension 50 may be referred to as a trailing arm suspension.

The rear suspension 50 includes rear arms 51L and 51R and shock absorbers 55L and 55R. The rear arms 51L and 51R are swing arms. The front portion of the rear arm 51L is rotatably supported on the left rear portion of the under frame 2u via a pivot 56L. The front portion of the rear arm 51R is rotatably supported on the right rear portion of the under frame 2u via a pivot 56R.

The upper portion of the shock absorber 55L and the upper portion of the shock absorber 55R are each rotatably supported by the rear frame 2r (FIG. 2). The lower portion of the shock absorber 55L rotatably supports the rear arm 51L. The lower portion of the shock absorber 55R rotatably supports the rear arm 51R.

An electric motor 60L is provided at the rear portion of the rear arm 51L. The electric motor 60L is an in-wheel motor, and the rear wheel 5L is provided on the electric motor The rear suspension 50 rotatably supports the rear wheel via the electric motor 60L. The electric motor 60R is provided at the rear portion of the rear arm 51R. The electric motor 60R is an in-wheel motor, and the rear wheel 5R is provided on the electric motor 60R. The rear suspension 50 rotatably supports the rear wheel 5R via the electric motor 60R. The rear wheels 5L and 5R are drive wheels.

The vehicle 1 of the present preferred embodiment employs large-sized wheels 4L, 4R, 5L and 5R. The outer diameters of the front wheels and the rear wheels are, for example, but not limited to, 14 inches or more. By employing larger-sized front wheels and rear wheels, it is possible to improve the driving performance on unpaved roads and bumps.

In the present preferred embodiment, two electric motors 60L and 60R are used to drive the rear wheels 5L and 5R independently of each other. By controlling the rotation of the left wheels and that of the right wheels independently, it is possible to enhance the stability of the behavior of the vehicle 1 when turning. With vehicles that have differential gears, when one drive wheel idles, it is difficult for the driving force to be transmitted to the other drive wheel. In the present preferred embodiment, even if one of the rear wheels 5L and 5R idles, the other can provide grip so as to continue driving stably.

Note that the electric motors driving the rear wheels 5L and 5R are not limited to in-wheel motors. For example, a single electric motor may transmit driving power to the rear wheels 5L and 5R.

Although a two-wheel drive configuration is illustrated here in which the electric motors 60L and 60R drive the rear wheels 5L and 5R, the vehicle 1 may be four-wheel drive. In that case, in-wheel motors are also provided for each of the front wheels 4L and 4R. Note that the driving force may be transmitted from one electric motor to the front wheels 4L and 4R. The driving force may be transmitted from one electric motor to each of the front wheels 4L and 4R and the rear wheels 5L and 5R.

The vehicle 1 of the present preferred embodiment includes the independent front suspension 40 and the independent rear suspension 50. Two electric motors 60L and 60R are used to drive the rear wheels 5L and 5R independently of each other. Thus, it is possible to improve the ability to follow road surface irregularities and stably transmit driving force to the road surface. It is also possible to improve the turning performance of the vehicle. According to the present preferred embodiment, it is possible to improve the vehicle's driving performance on unpaved roads and bumps.

Note that the front suspension 40 and the rear suspension 50 are not limited to independent suspensions, but may be axle suspensions.

The present preferred embodiment employs in-wheel motors as the electric motor. This eliminates the need to provide space for arranging the electric motor and the power transmission mechanism in the body portion of the vehicle, thus saving space. Since a drive shaft extending in the left-right direction of the vehicle 1 is not required, the rear suspension 50 is not restricted by the drive shaft. In the rear suspension 50, the rear arms 51L and 51R extend in the front-rear direction and the pivots 56L and 56R are located forward relative to a rotation shaft 57 of the rear wheel 5L and 5R. With such a configuration, it is possible to increase the wheel stroke of the rear suspension 50.

The wheel stroke of the rear suspension 50 is, for example, but not limited to, 60 mm or more. As the wheel stroke is as large as 60 mm or more, it is possible to improve the driving performance on unpaved roads and bumps. The upper limit of the wheel stroke of the rear suspension 50 may vary depending on the size of the vehicle 1, and is for example, but not limited to, 150 mm.

Since the drive shaft is not needed and the rear arms 52L and 51R are not located near the central portion of the rear of the vehicle, it is possible to provide space near the central portion of the rear of the vehicle. The space near the central portion of the rear of the vehicle makes it difficult for the main body portion of the vehicle to come into contact with the ground even when a large difference in position in the up-down direction occurs between the left and right rear wheels 5L and 5R in response to the action of the independent rear suspension 50. Note that if the drive power is transmitted to the rear wheels 5L and 5R from a single electric motor instead of using in-wheel motors, the vehicle 1 may include a drive shaft.

Figure 6:
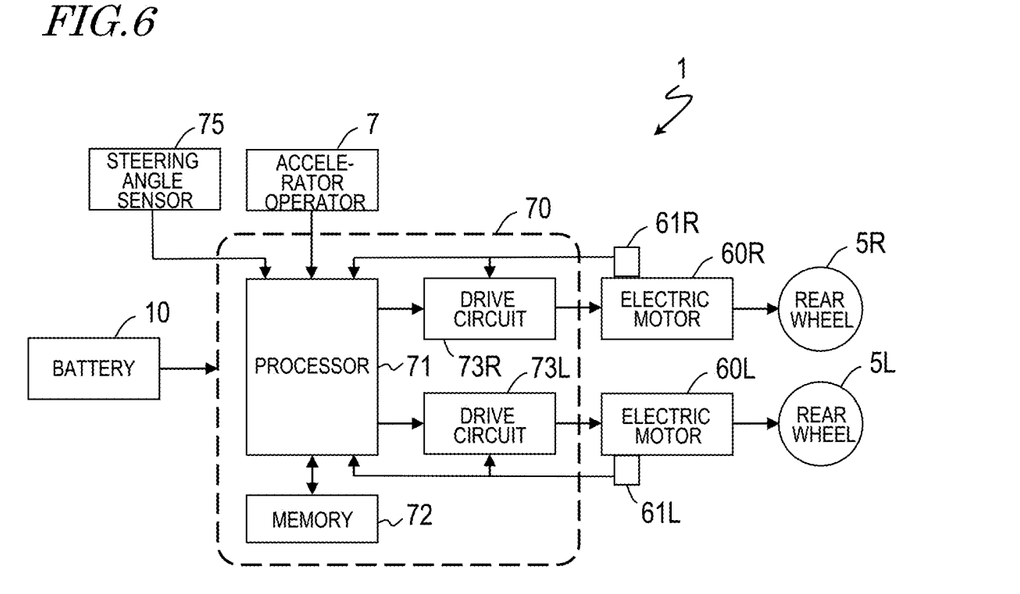
FIG. 6 is a block diagram showing the electrical configuration of the vehicle 1 according to a preferred embodiment of the present invention.

Next, the control of the electric motors 60L and 60R will be described. FIG. 6 is a block diagram showing the electrical configuration of the vehicle 1. The vehicle 1 includes a control device 70. The control device 70 controls the action of the vehicle 1. The control device 70 is, for example, a Motor Control Unit (MCU). Typically, the control device 70 includes a semiconductor integrated circuit, such as a microcontroller, a signal processor, etc., capable of performing digital signal processing.

The control device 70 includes a processor 71, a memory 72 and drive circuits 73L and 73R. The processor 71 controls the action of the electric motors 60L and 60R and the action of the various parts of the vehicle 1. The memory 72 stores a computer program that defines procedures for controlling the action of the electric motors 60L and 60R and the various parts of the vehicle 1. The processor 71 reads the computer program from the memory 72 and performs various controls. The control device 70 is supplied with electric power from the battery 10. The control device 70 and the battery 10 can be installed at any position of the vehicle 1, for example, but not limited to, downward of the seat 3. The battery 10 can be provided so as to be removable from the vehicle 1. For example, the battery 10 may be attached/removed to/from the rear of the seat 3. By arranging the battery 10 at an end portion of the vehicle around the seat 3, the passenger can easily attach/remove the battery 10.

The accelerator operator 7 outputs to the processor 71 a signal in accordance with the amount by which the accelerator is operated by the passenger. The steering angle sensor 75 is provided on the head tube 22 or the steering column 26, for example, and outputs a signal to the processor 71 in accordance with the angle of rotation of the steering column 26.

The electric motor 60L is provided with a rotation sensor 61L. The rotation sensor 61L detects the rotation angle of the electric motor 60L and outputs a signal in accordance with the rotation angle to the processor 71 and the drive circuit 73L. The processor 71 and the drive circuit 73L calculate the rotation speed of the electric motor 60L from the output signal of the rotation sensor 61L.

The electric motor 60R is provided with a rotation sensor 61R. The rotation sensor 61R detects the rotation angle of the electric motor 60R and outputs a signal in accordance with the rotation angle to the processor 71 and the drive circuit 73R. The processor 71 and the drive circuit 73R calculate the rotation speed of the electric motor 60R from the output signal of the rotation sensor 61R. The sizes of the rear wheels 5L and 5R are stored in the memory 72 in advance, and the driving speed of the vehicle 1 can be calculated from the rotation speed of the electric motors 60L and 60R.

The processor 71 calculates, and transmits to the drive circuits 73L and 73R, a command value for generating an appropriate driving force from the output signal of the accelerator operator 7, the output signal of the steering angle sensor 75, the traveling speed of the vehicle, and information stored in the memory 72, etc. The processor 71 can send different command values to the drive circuits 73L and 73R depending on the driving condition of the vehicle.

The drive circuits 73L and 73R include, for example, inverters. The drive circuit 73L supplies a drive current in accordance with the command value from the processor 71 to the electric motor 60L. The drive circuit 73R supplies the drive current in accordance with the command value from the processor 71 to the electric motor 60L. The electric motors 60L and 60R to which the drive current is supplied rotate, thus causing the rear wheels 5L and 5R to rotate. If the electric motors 60L and 60R include decelerators, the rotation is transmitted to the rear wheels 5L and 5R via those decelerators.

As described above, the vehicle 1 of the present preferred embodiment includes wheels 4L, 4R, 5L and 5R with a larger outer diameter. Thus, it is possible to improve the running performance on unpaved roads and bumps. On the other hand, the overall length (length in the front-rear direction) of the vehicle 1 may be limited. For example, the Japanese Industrial Standard "JIS T 9208:2016" for handle-type electric wheelchairs limits the overall length of the vehicle to 1200 mm or less. If the overall length of the vehicle 1 is limited in this way, the wheelbase will be shorter if the outer diameter of the wheels is increased.

Referring to FIG. 2, the outer diameters Dw of the wheels 4L, 4R, 5L and 5R of the present preferred embodiment are relatively large at 0.26 times or more of the overall length Lo of the vehicle 1. The wheelbase WB of the vehicle 1 and the outer diameter Dw of the wheel satisfy the following relationship: WB/Dw≤2.5, and the wheelbase WB is relatively short.

With such a vehicle 1 having a short wheelbase WB, the foot space for the passenger is small. Therefore, in the vehicle 1, the seat 3 is arranged in a high position to raise the position of the waist of the passenger. For example, the height Hb (FIG. 2) from the road surface 15 to an upper end portion 35 of the seat base 31 is 500 mm or more. Thus, even if the passenger's foot space is small, the passenger can fit both feet in that space and ride comfortably. The upper limit of the height Hb is, for example, but not limited to, 700 mm. These values of the height Hb are those when an object 12 (FIG. 7) with a mass of 75 kg is placed on the seat 3. The details of the object 12 will be described below. The upper limit of the wheel outer diameter Dw is, for example, but not limited to, 0.4 times the overall length Lo of the vehicle 1. The lower limit of the relationship "WB/Dw" between the wheelbase WB and the wheel outer diameter Dw is for example, but not limited to, 1.5.

With the vehicle 1 having a short wheelbase WB, the behavior of the vehicle can change sensitively to front/rear load transfer. That is, pitching can easily occur during acceleration and deceleration in the vehicle 1 with a short wheelbase WB. When pitching occurs, the passenger may feel discomfort. The vehicle 1 of the present preferred embodiment reduces or prevents the occurrence of such pitching.

Figure 7:
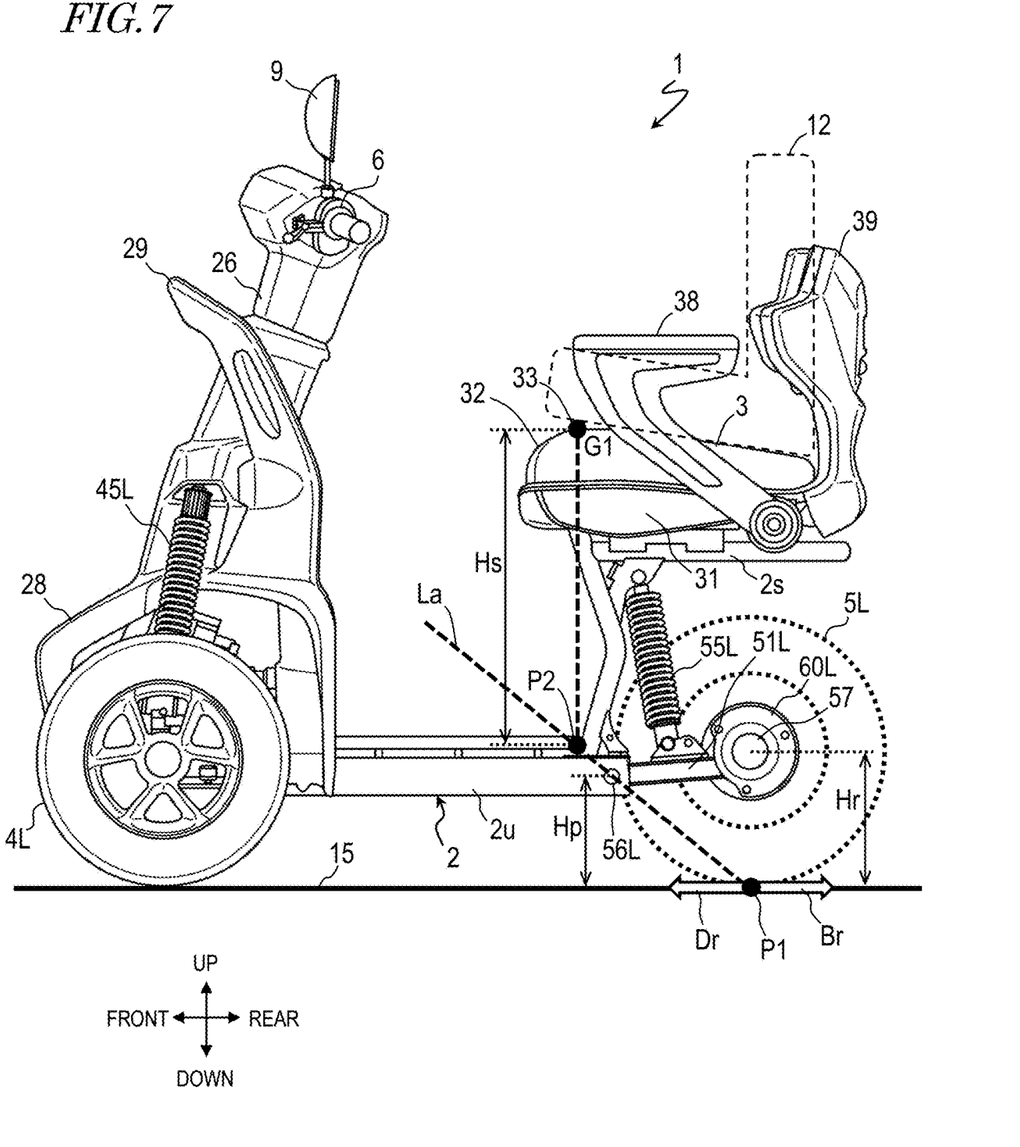
FIG. 7 is a left side view showing the vehicle 1 in a predetermined state according to a preferred embodiment of the present invention.
Figure 8:
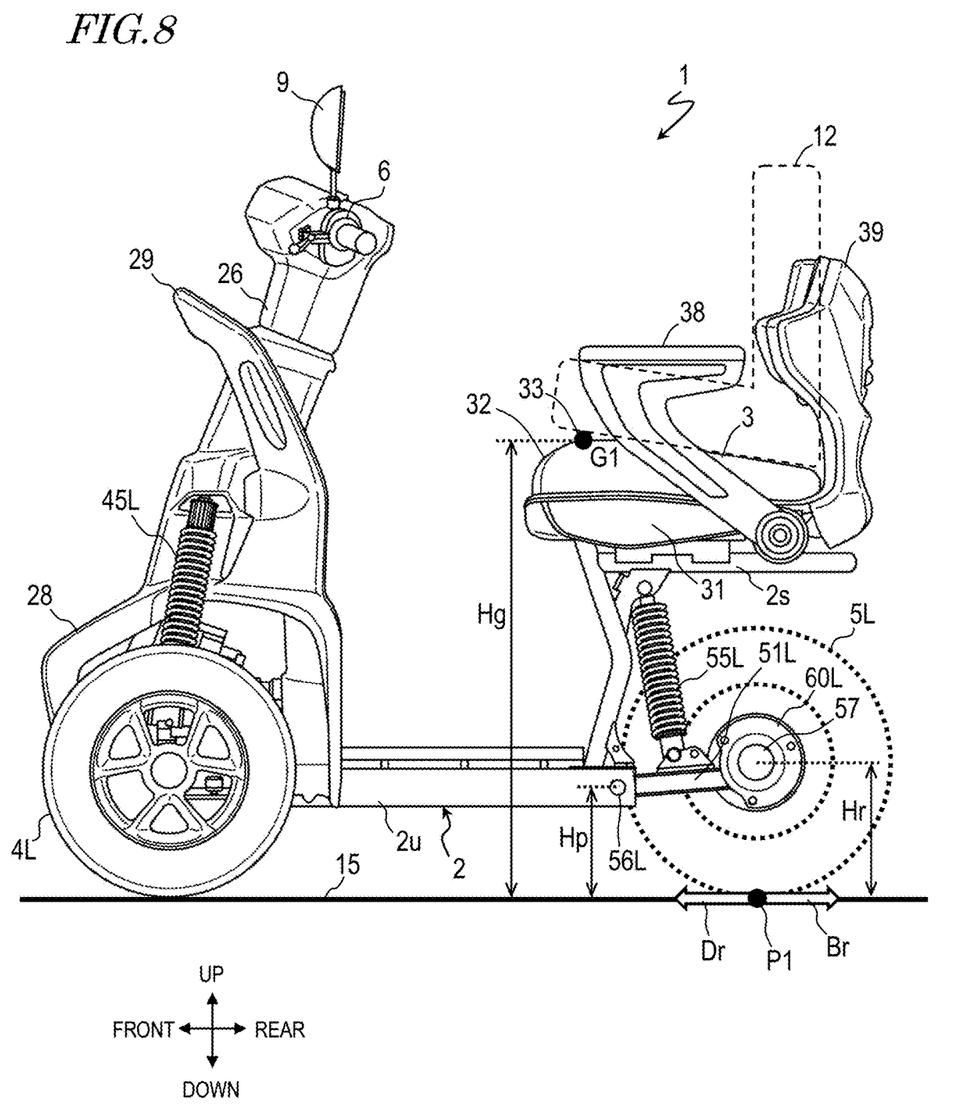
FIG. 8 is a left side view showing the vehicle 1 in a predetermined state according to a preferred embodiment of the present invention.

FIG. 7 and FIG. 8 are left side views showing the vehicle 1. FIG. 7 and FIG. 8 show the vehicle 1 in a predetermined state, stationary on the level road surface 15 with the object 12 having a mass of 75 kg on the seat 3. The object 12 is one of the "weights" specified in the Japanese Industrial Standard "JIS T 9208:2016" for handle-type electric wheelchairs. By placing such a weight 12 on the seat 3, it is possible to simulate the state in which a human rides in the vehicle 1.

The position of the center of gravity G1 of the entire vehicle including the weight 12 placed on the seat 3 can be generally in an upper portion of the seat 3. In this example, the position of the upper end portion 33 of the front portion of the seat 3 is the position of the center of gravity G1 of the entire vehicle. The position of the upper end portion 33 of the front portion of the seat 3 is the highest position through the extent of the seat 3 forward of the center in the front-rear direction.

While the features of the rear wheel 5L, the rear arm 51L and the pivot 56L will be described primarily, the features of the rear wheel 5R, the rear arm 51R and the pivot 56R are the same.

Pitching during acceleration and deceleration is mainly affected by the moment generated around the pivot 56L. When the vehicle 1 accelerates, a driving force is applied to the road surface 15 from the rear wheel 5L, which is a drive wheel. At this time, the reaction force Dr that the rear wheel 5L receives from the road surface 15 in the tangential direction between the rear wheel 5L and the road surface 15 acts on the pivot 56L, and a moment Mt is generated around the pivot 56L. Also, a moment Mw is generated around the pivot 56L due to the load change ΔWr on the rear wheel 5L side caused by the inertia force applied to the center of gravity G1, etc.

When the vehicle 1 decelerates by applying the brakes, the reaction force Br that the rear wheel 5L receives from the road surface 15 in the tangential direction between the rear wheel 5L and the road surface 15 acts on the pivot 56L. The moment during deceleration is opposite in sign to the moment during acceleration.

The load change ΔWr1 on the rear wheel 5L side due to the inertia force on the center of gravity G1 is expressed as follows.

$$\Delta Wr1 = (Hs/WB) \times Dr$$

Here, Hs is the distance in the up-down direction between the upper end portion 33 of the front portion of the seat 3 and the line of action La where the reaction force Dr acts on the pivot 56L, as seen in a side view of a predetermined state in which the vehicle is stationary on the level road surface 15 with the weight 12 placed on the seat 3. The line of action La passes through the position P1 where the rear wheel 5L contacts the road surface 15 and the center of the pivot 56L as seen in a side view of the predetermined state. The position P1 is the position of the center in the front-rear direction on the contact surface between the rear wheel 5L and the road surface 15. Hs is the distance between the center of gravity G1 and the intersection P2, where P2 is the intersection between the line extending in the vertical direction from the center of gravity G1 and the line of action La as seen in a side view of the predetermined state. WB is the wheel base (FIG. 2).

The load change ΔWr2 on the rear wheel 5L side due to the reaction force Dr is expressed as follows.

$$\Delta Wr2 = (-Hp/Lr) \times Dr$$

Here, Hp is the height from the road surface 15 to the center of the pivot 56L. Lr is the length (FIG. 5) in the front-rear direction between the pivot 56L and the rotation shaft 57 of the rear wheel 5L with the weight 12 placed on the seat 3.

The load change ΔWr on the rear wheel 5L side is expressed as follows.

$$\Delta Wr = \Delta Wr1 + \Delta Wr2$$

The load change ΔWf on the front wheel 4L side due to the inertia force on the center of gravity G1 is expressed as follows.

$$\Delta Wf = -(Hg/WB) \times Dr$$

Here, Hg is the height (FIG. 8) from the road surface 15 to the center of gravity G in the predetermined state described above. In the present preferred embodiment, the moment M generated around the pivot 56L is adjusted by also taking into consideration the load change applied to the front wheel 4L side.

The moment Mt described above is expressed as follows.

$$Mt = -Hp \times Dr$$

The moment Mw described above is expressed as follows.

$$Mw = (Hs/WB) \times Dr \times Lr$$

The moment M generated around the pivot 56L is expressed as follows.

$$M = Mt + Mw$$

As the moments Mt and Mw are expressed by the expressions above, the moment M is expressed as follows.

$$M = Dr \times \{(Hs \times Lr/WB) - Hp\}$$

The ratio "Lr/WB" between the wheelbase WB and the length Lr can be generally determined by the specifications of the vehicle 1. Therefore, the relationship between the distance Hs and the height Hp of the pivot 56L is important in order to set the moment M during acceleration and deceleration to an appropriate magnitude.

When trying to achieve a flat behavior with reduced or prevented pitching in the vehicle 1, it is necessary to take into consideration the movement of the front side of the vehicle. The front side also slightly moves up and down during acceleration and deceleration. In the present preferred embodiment, rather than simply attempting to set the moment M to zero, the moment M is set to an appropriate magnitude while taking into consideration such a movement on the front side.

When the load change ΔWr on the rear wheel 5L side is equal to the load change ΔWf on the front wheel 4L side, the behavior of the vehicle 1 is flat. With a handle-type electric wheelchair, typically, WB is generally six times longer than Lr. 5/2Hp=Hs holds, with the following approximation.

$$\Delta Wr = \Delta Wf$$

$$Hg = Hp + Hs$$

$$WB = 6Lr$$

When Hp and Hs are in this relationship, it is possible to realize a flat behavior with reduced or prevented pitching. However, the passenger may rather feel a natural ride feel if the rear side sinks slightly during acceleration or the front side sinks slightly during deceleration.

The present inventors have conducted an in-depth study and discovered that it is possible to realize a natural ride feel while efficiently reducing or preventing pitching when the distance Hs and the height Hp as viewed in a side view of the predetermined state satisfy the following expression.

$$3.0 \leq Hs/Hp$$

By raising the position of the center of gravity G1 relative to the line of action La, it is possible to increase the proportion by which the pitching caused by the reaction that the rear wheel 5L receives from the road surface 15 during acceleration and deceleration is reduced or prevented by the inertia force. As a result, it is possible to reduce or prevent pitching during acceleration and deceleration. Pitching can also be efficiently reduced or prevented when the height Hp of the center of the pivot is lower than the height Hr of the center of the rotation shaft 57 of the rear wheel 5L in the predetermined state.

Next, an example of the upper limit of "Hs/Hp" will be described. 11/2Hp=Hs holds when considering a vehicle with a short Lr relative to WB such as WB=12Lr. When Hp and Hs are in this relationship, it is possible to realize a flat behavior with reduced or prevented pitching. However, the passenger may rather feel a natural ride feel if the rear side sinks slightly during acceleration or the front side sinks slightly during deceleration. The present preferred embodiment achieves a natural ride feel for various relationships between WB and Lr, for example.

The present inventors have conducted an in-depth study and discovered that it is possible to realize a natural ride feel while efficiently reducing or preventing pitching when the distance Hs and the height Hp as viewed in a side view of the predetermined state satisfy the following expression.

$$Hs/Hp \leq 6.0$$

By setting the upper limit of "Hs/Hp" to 6.0, it is possible to realize a natural ride feel while efficiently reducing or preventing pitching.

Note that the upper limit of "Hs/Hp" is not limited to 6.0.

The present inventors further discovered that it is possible to efficiently reduce or prevent pitching when 3.0≤(Hg−Hp)/Hp is satisfied, where the height from the road surface to the center of gravity G in the predetermined state is Hg (FIG. 8).

By increasing the distance between the position of the center of gravity G1 and the position of the pivot 56L, it is possible to increase the proportion by which the pitching caused by the reaction that the rear wheel 5L receives from the road surface 15 during acceleration and deceleration is reduced or prevented by the inertia force. Thus, it is possible to reduce or prevent pitching during acceleration and deceleration. The upper limit of "(Hg−Hp)/Hp" is, for example, but not limited to, 6.0.

While the position of the center of gravity G1 is the position of the upper end portion 33 of the front portion of the seat 3 in the above description, the position may also be the position of the upper end portion of the seat surface of the seat 3.

Figure 9:
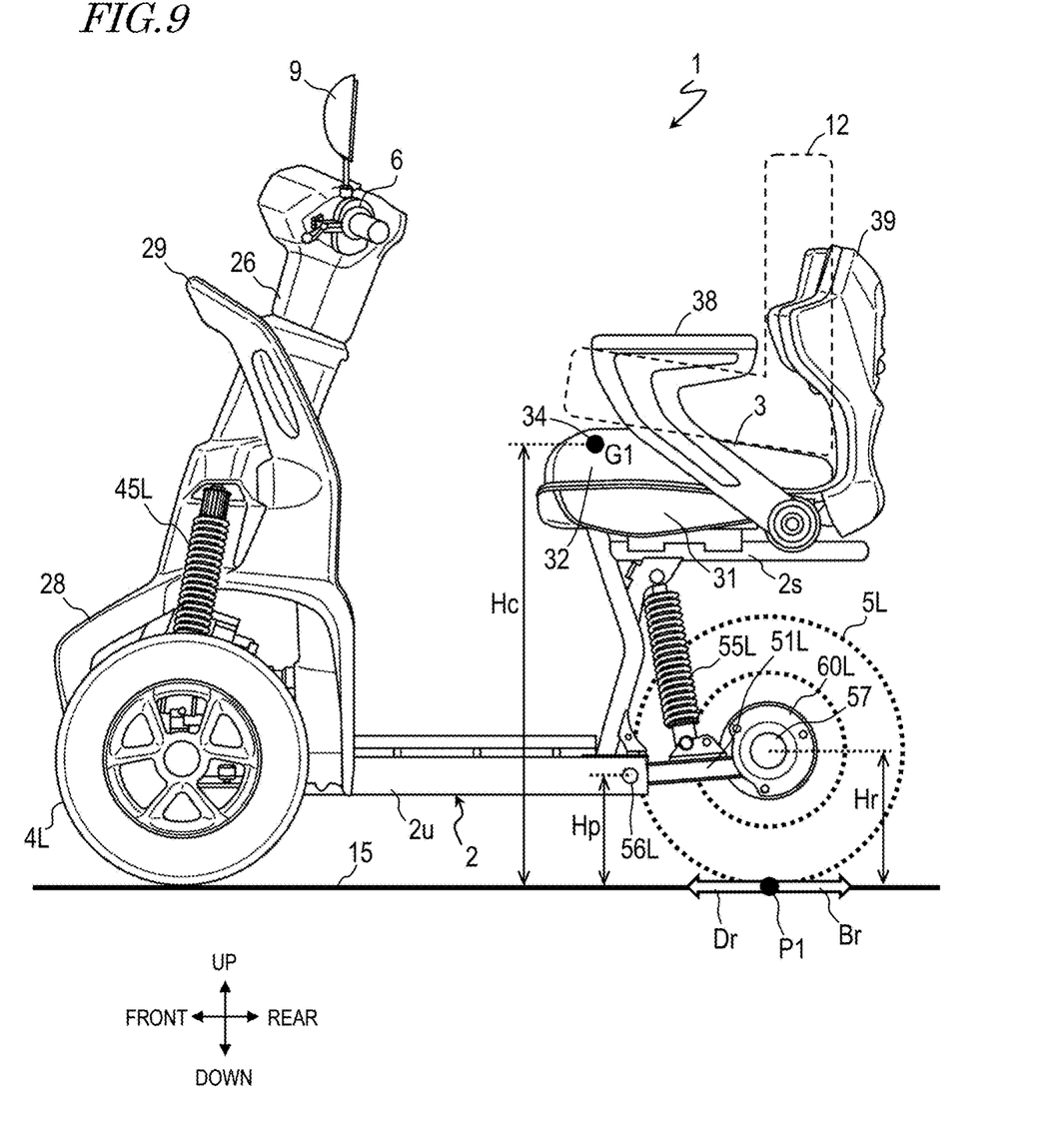
FIG. 9 is a left side view showing the vehicle 1, where the position of gravity G1 is located in an upper end portion of the seat surface of a seat 3.

FIG. 9 is a left side view showing the vehicle 1, where the position of the center of gravity G1 is the position of the upper end portion of the seat surface of the seat 3. FIG. 9 shows the vehicle 1 in the predetermined state in which the vehicle 1 is stationary on the level road surface 15 with the weight 12 placed on the seat 3. The seat surface 36 (FIG. 1) of the seat 3 is the upper surface of the cushion 32 (FIG. 2) of the seat 3. In the present preferred embodiment, the highest position on the line CL, which passes through the center of the seat surface 36 in the left-right direction and extends in the front-rear direction along the shape of the seat surface 36, is the position of an upper end portion 34 (FIG. 9) of the seat surface 36. In the example shown in FIG. 9, the position of the upper end portion 34 of the seat surface 36 is the position of the center of gravity G1.

It is possible to efficiently reduce or prevent pitching when $3.0 \leq (Hc-Hp)/Hp$ is satisfied, where in the predetermined state, the height from the road surface 15 to the position of the upper end portion 34 of the seat surface 36 (the position of the center of gravity G1) is Hc.

By increasing the distance between the position of the center of gravity G1 and the position of the pivot 56L, it is possible to increase the proportion by which the pitching caused by the reaction that the rear wheel 5L receives from the road surface 15 during acceleration and deceleration is reduced or prevented by the inertia force. Thus, it is possible to reduce or prevent pitching during acceleration and deceleration. The upper limit of "(Hc−Hp)/Hp" is, for example, but not limited to, 6.0.

While the vehicle 1 is a four-wheeled handle-type electric wheelchair in the description of the preferred embodiments above, the vehicle 1 is not limited thereto. The vehicle 1 may be a joystick-type electric wheelchair. The vehicle 1 is not limited to a wheelchair, but may be another vehicle.

The number of wheels of the vehicle 1 is not limited to four wheels. The number of wheels may be three or more. The drive source to drive the wheels is not limited to an electric motor, but may be an internal combustion engine. The driving force may be transmitted from one drive source to multiple wheels.

Illustrative preferred embodiments of the present invention have been described above.

A vehicle 1 according to a preferred embodiment of the present invention includes at least three wheels including a front wheel 4L, 4R and a rear wheel 5L, 5R; a drive source 60L, 60R to drive the rear wheel 5L, 5R; and a rear suspension 50 including a rear arm 51L, 51R supporting the rear wheel 5L, 5R and a pivot 56L, 56R that is located forward relative to a rotation shaft 57 of the rear wheel 5L, 5R; and a seat 3 on which a passenger is to be seated, wherein a relationship $WB/Dw \leq 2.5$ is satisfied where WB is a wheelbase of the vehicle 1, and Dw is an outer diameter of the rear wheel 5L, 5R, and a relationship $3.0 \leq Hs/Hp$ is satisfied where Hp is a height from a road surface 15 to the pivot 56L, 56R, and Hs is a distance in an up-down direction between an upper end portion 33 of a front portion of the seat 3 and a line of action La where a reaction of a driving force that the rear wheel 5L, 5R receives from the road surface 15 acts on the pivot 56L, 56R, as seen in a side view of a predetermined state in which the vehicle 1 is stationary on the level road surface 15 and when an object 12 having a mass of 75 kg is placed on the seat 3.

In order to improve the running performance on unpaved roads and bumps of the vehicle 1, one may consider increasing the outer diameter of the front wheel 4L, 4R and the rear wheel 5L, 5R. On the other hand, where the length of the vehicle 1 in the front-rear direction is limited, the wheelbase WB may be short if the outer diameter of the wheel is increased. If the wheelbase WB is short, pitching is likely to occur during acceleration and deceleration, and the passenger may feel discomfort.

In a preferred embodiment of the present invention, in the vehicle 1 having a short wheelbase WB where $WB/Dw \leq 2.5$ is satisfied, a relationship $3.0 \leq Hs/Hp$ is satisfied.

Thus, a moment that acts on the pivot 56L, 56R during acceleration and deceleration can be set to an appropriate magnitude, and it is possible to reduce or prevent pitching.

A vehicle 1 according to a preferred embodiment of the present invention includes at least three wheels including a front wheel 4L, 4R and a rear wheel 5L, 5R; a drive source 60L, 60R to drive the rear wheel 5L, 5R; and a rear suspension 50 including a rear arm 51L, 51R supporting the rear wheel 5L, 5R and a pivot 56L, 56R that is located forward of a rotation shaft 57 of the rear wheel 5L, 5R; and a seat 3 on which a passenger is to be seated, wherein a relationship $WB/Dw \leq 2.5$ is satisfied where WB is a wheelbase of the vehicle 1, and Dw is an outer diameter of the rear wheel 5L, 5R; and a relationship $3.0 \leq (Hg-Hp)/Hp$ is satisfied where Hp is a height from a road surface 15 to the pivot 56L, 56R, and Hg is a height from the road surface 15 to an upper end portion 33 of a front portion of the seat 3, in a predetermined state in which the vehicle is stationary on the level road surface 15 with an object 12 having a mass of 75 kg placed on the seat 3.

In order to improve the running performance on unpaved roads and bumps of the vehicle 1, one may consider increasing the outer diameter of the wheels. On the other hand, where the length of the vehicle 1 in the front-rear direction is limited, the wheelbase WB may be short if the outer diameter of the wheel is increased. If the wheelbase WB is short, pitching is likely to occur during acceleration and deceleration, and the passenger may feel discomfort.

In a preferred embodiment of the present invention, in the vehicle 1 having a short wheelbase WB where $WB/Dw \leq 2.5$ is satisfied, a relationship $3.0 \leq (Hg-Hp)/Hp$ is satisfied.

By increasing the distance between the upper end portion 33 of the front portion of the seat 3, which is the position of the center of gravity G1, and the position of the pivot 56L, 56R, it is possible to increase the proportion by which the pitching caused by the reaction that the rear wheel 5L, 5R receives from the road surface 15 during acceleration and deceleration is reduced or prevented by the inertia force. Thus, it is possible to reduce or prevent pitching during acceleration and deceleration.

In a preferred embodiment, the line of action La may pass through the position P1 at which the rear wheel 5L, 5R contacts the road surface 15 and a center of the pivot 56L, 56R as seen in a side view of the predetermined state.

It is possible to realize reduction or prevention of pitching while taking into consideration the transmission, to the pivot 56L, 56R, of the reaction that the rear wheel 5L, 5R receives from the road surface 15.

In a preferred embodiment, the vehicle 1 may satisfy a relationship $3.0 \leq Hs/Hp \leq 6.0$.

In the vehicle 1 having a short wheelbase WB, as $3.0 \leq Hs/Hp \leq 6.0$ is satisfied, the moment acting on the pivot 56L, 56R during acceleration and deceleration can be set to an appropriate magnitude, and it is possible to reduce or prevent pitching.

In a preferred embodiment, the vehicle 1 may satisfy a relationship $3.0 \leq (Hc-Hp)/Hp$ where Hc is a height from the road surface to an upper end portion 34 of a seat surface of the seat 3 in the predetermined state.

By increasing the distance between the seat surface position of the seat 3 and the position of the pivot 56L, 56R, it is possible to increase the proportion by which the pitching caused by the reaction that the rear wheel 5L, 5R receives from the road surface 15 during acceleration and deceleration is reduced or prevented by the inertia force. Thus, it is possible to reduce or prevent pitching during acceleration and deceleration.

In a preferred embodiment, the vehicle 1 may satisfy a relationship $3.0 \leq (Hc-Hp)/Hp \leq 6.0$ in the predetermined state.

As the distance between the seat surface position of the seat 3 and the position of the pivot 56L, 56R is increased, it is possible to reduce or prevent pitching during acceleration and deceleration.

In a preferred embodiment, the vehicle 1 may satisfy a relationship 3.0≤(Hg−Hp)/Hp≤6.0 in the predetermined state.

In the vehicle 1 having a short wheelbase WB, as a relationship 3.0≤(Hg−Hp)/Hp≤6.0 is satisfied, it is possible to increase the proportion by which the pitching caused by the reaction that the rear wheel 5L, 5R receives from the road surface 15 during acceleration and deceleration is reduced or prevented by the inertia force. Thus, it is possible to reduce or prevent pitching during acceleration and deceleration.

In a preferred embodiment, the vehicle 1 may satisfy a relationship 1.5≤WB/Dw≤2.5.

In the vehicle 1 having a short wheelbase WB, it is possible to reduce or prevent pitching during acceleration and deceleration.

In a preferred embodiment, the seat 3 may include a seat base 31 and a cushion 32 above the seat base 31, and a height from the road surface 15 to an upper end portion 35 of the seat base 31 may be 500 mm or more in the predetermined state.

As the position of the seat 3 is as high as 500 mm or more, even if the wheelbase WB is short and the passenger's foot space is small, the passenger can be seated.

In a preferred embodiment, a height from the road surface 15 to the upper end portion 35 of the seat base 31 may be 500 mm or more and 700 mm or less in the predetermined state.

As the position of the seat 3 is high, even if the wheelbase WB is short and the passenger's foot space is small, the passenger can be seated.

In a preferred embodiment, a height of the pivot may be lower than a height of a rotation shaft of the rear wheel in the predetermined state.

The moment acting on the pivot during acceleration and deceleration can be set to an appropriate magnitude, and it is possible to reduce or prevent pitching.

In a preferred embodiment, a wheel stroke of the rear suspension 50 may be 60 mm or more.

As the wheel stroke is as large as 60 mm or more, it is possible to improve the driving performance on unpaved roads and bumps.

In a preferred embodiment, the wheel stroke of the rear suspension 50 may be 60 mm or more and 150 mm or less.

As the wheel stroke is large, it is possible to improve the driving performance on unpaved roads and bumps.

In a preferred embodiment, the vehicle 1 may be a handle-type electric wheelchair 1 having a handle 6 that is steered by the passenger.

It is possible to realize the handle-type electric wheelchair 1, wherein pitching during acceleration and deceleration is reduced or prevented.

Preferred embodiments of the present invention are particularly useful in the field of vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   at least three wheels including a front wheel and a rear wheel;
   a drive source to drive the rear wheel;
   a suspension including a swing arm supporting the rear wheel and a pivot located forward of a rotation shaft of the rear wheel; and
   a seat on which a passenger is to be seated; wherein
   a relationship WB/Dw≤2.5 is satisfied, where WB is a wheelbase of the vehicle, and Dw is an outer diameter of the rear wheel; and
   a relationship 3.0≤Hs/Hp is satisfied, where Hp is a height from a level road surface to the pivot, and Hs is a distance in an up-down direction between an upper end portion of a front portion of the seat and a line of action where a reaction of a driving force that the rear wheel receives from the road surface acts on the pivot as seen in a side view of a predetermined state in which the vehicle is stationary on the road surface and when an object having a mass of 75 kg is placed on the seat.

2. A vehicle comprising:
   at least three wheels including a front wheel and a rear wheel;
   a drive source to drive the rear wheel;
   a suspension including a swing arm supporting the rear wheel and a pivot located forward of a rotation shaft of the rear wheel; and
   a seat on which a passenger is to be seated; wherein
   a relationship WB/Dw≤2.5 is satisfied where WB is a wheelbase of the vehicle, and Dw is an outer diameter of the rear wheel; and
   a relationship 3.0≤(Hg−Hp)/Hp is satisfied where Hp is a height from a level road surface to the pivot, and Hg is a height from the road surface to an upper end portion of a front portion of the seat in a predetermined state in which the vehicle is stationary on the road surface and when an object having a mass of 75 kg is placed on the seat.

3. The vehicle according to claim 1, wherein the line of action passes through a position at which the rear wheel contacts the road surface and a center of the pivot as seen in the side view of the predetermined state.

4. The vehicle according to claim 1, wherein a relationship 3.0≤Hs/Hp≤6.0 is satisfied.

5. The vehicle according to claim 1, wherein a relationship 3.0≤(Hc−Hp)/Hp is satisfied where Hc is a height from the road surface to an upper end portion of a seat surface of the seat in the predetermined state.

6. The vehicle according to claim 5, wherein a relationship 3.0≤(Hc−Hp)/Hp≤6.0 is satisfied in the predetermined state.

7. The vehicle according to claim 2, wherein a relationship 3.0≤(Hg−Hp)/Hp≤6.0 is satisfied in the predetermined state.

8. The vehicle according to claim 1, wherein a relationship 1.5≤WB/Dw≤2.5 is satisfied.

9. The vehicle according to claim 1, wherein
   the seat includes a seat base and a cushion above the seat base; and
   a height from the road surface to an upper end portion of the seat base is 500 mm or more in the predetermined state.

10. The vehicle according to claim 9, wherein a height from the road surface to the upper end portion of the seat base is 500 mm or more and 700 mm or less in the predetermined state.

11. The vehicle according to claim 1, wherein a height of the pivot is lower than a height of the rotation shaft of the rear wheel in the predetermined state.

12. The vehicle according to claim 1, wherein a wheel stroke of the suspension is 60 mm or more.

13. The vehicle according to claim 12, wherein the wheel stroke of the suspension is 60 mm or more and 150 mm or less.

14. The vehicle according to claim 1, wherein the vehicle is an electric wheelchair including a handle to be steered by the passenger.

\* \* \* \* \*